United States Patent

Saldana

(10) Patent No.: US 9,136,085 B2
(45) Date of Patent: Sep. 15, 2015

(54) SHOCK-RESISTANT IMAGE INTENSIFIER

(71) Applicant: HVM Technology, Inc., New Braunfels, TX (US)

(72) Inventor: Michael R. Saldana, New Braunfels, TX (US)

(73) Assignee: HVM Technology, Inc., New Braunfels, TX (US)

( * ) Notice: Subject to any disclaimer, the term of this patent is extended or adjusted under 35 U.S.C. 154(b) by 175 days.

(21) Appl. No.: 13/903,920

(22) Filed: May 28, 2013

(65) Prior Publication Data

US 2013/0320192 A1 Dec. 5, 2013

Related U.S. Application Data

(60) Provisional application No. 61/652,922, filed on May 30, 2012.

(51) Int. Cl.
*H01J 31/50* (2006.01)
*G02B 23/12* (2006.01)

(52) U.S. Cl.
CPC ............... *H01J 31/507* (2013.01); *G02B 23/12* (2013.01); *H01J 2231/5016* (2013.01)

(58) Field of Classification Search
CPC .......... G02B 23/12; H01J 2231/5016
USPC .......... 250/207, 214 VT, 473.1, 474.1; 313/525, 103 CM
See application file for complete search history.

(56) References Cited

U.S. PATENT DOCUMENTS

| 5,528,418 | A | * | 6/1996 | Bowman, Jr. ................. 359/400 |
| 6,087,660 | A |   | 7/2000 | Morris et al. |
| 7,696,462 | B2 |  | 4/2010 | Saldana |
| 2001/0022831 | A1 | | 9/2001 | Meek et al. |
| 2007/0223087 | A1 | | 9/2007 | Pochapsky |
| 2009/0108180 | A1 | * | 4/2009 | Saldana ................. 250/214 VT |

FOREIGN PATENT DOCUMENTS

| EP | 0262614 | 4/1988 |
| EP | 1139382 | 10/2001 |
| WO | WO 2014/031208 A2 | 2/2014 |
| WO | WO 2014/031208 A8 | 2/2014 |

OTHER PUBLICATIONS

PCT International Search Report and Written Opinion in PCT International Application Serial No. PCT/US2013/043410 mailed on Apr. 22, 2014.
PCT International Preliminary Report on Patentability in PCT International Application Serial No. PCT/US2013/043410 Dec. 2, 2014.

* cited by examiner

*Primary Examiner* — Tony Ko
(74) *Attorney, Agent, or Firm* — Patent Capital Group

(57) ABSTRACT

In one exemplary embodiment, a shock-resistant night vision assembly is configured to detect a high-acceleration event, for example, resulting from a round or burst of high-caliber rifle fire. Upon detecting the event, a voltage such as a photocathode voltage is forced to an inactive or protective level and held there for approximately 50 ms, giving time for mechanical excursions of the microchannel plate to settle out. Damage from physical impact and electrostatic discharge may thus be mitigated.

27 Claims, 2 Drawing Sheets ial Patent
SHOCK-RESISTANT IMAGE INTENSIFIER

CROSS REFERENCE TO RELATED APPLICATIONS

This application claims priority to U.S. Provisional Patent Application 61/652,922, filed May 30, 2012 and entitled, "Shock-Resistant Image Intensifier," which is incorporated herein by reference in its entirety.

BACKGROUND OF THE INVENTION

This specification relates to the field of image intensifiers, and more particularly to an image intensifier resistant to mechanical shocks.

Image intensifiers are known in the art. For example, an image intensifier is disclosed in U.S. Pat. No. 7,696,462, filed Oct. 30, 2008, which is incorporated herein by reference in its entirety. The structure of a prior art image intensifier comprises a gallium arsenide (GaAs) or similar photocathode, a microchannel plate (MCP), and a phosphor screen. When illuminated by an incident photon beam, the photocathode emits electrons into the vacuum space between the photocathode and MCP. The electrons are accelerated toward the MCP by an applied voltage. The electrons enter the channels of the MCP, where each photon is accelerated along a single channel by a large negative voltage difference between the input face and the output face. As the photon is accelerated, it strikes the walls of the microchannel, releasing additional photons. Thus, by the process of secondary electron emission, the MCP amplifies the incident electron flux up to thousands of times. The electrons exiting the MCP are accelerated toward the screen and converted back to light by the phosphor layer on the screen. The result is an image with the brightness strongly multiplied.

BRIEF DESCRIPTION OF THE DRAWINGS

This specification is best understood when read in conjunction with the included figures, which disclose one or more exemplary embodiments of an image intensifier. In accordance with standard practices, various features are not drawn to scale and are used for illustration purposes only.

SUMMARY OF THE INVENTION

In one aspect, this specification discloses a method comprising:
providing a voltage at an active level between a photocathode and an input face of a microchannel plate;
detecting a high-acceleration event; and
responsive to the high-acceleration event, maintaining the voltages at a protective level for a time span selected to permit acceleration-induced perturbations of the microchannel plate to settle.

In another aspect, this specification discloses a controller for an image intensifier comprising:
a shock sensor interface;
a voltage switch configured to receive an active voltage input and a protective voltage input; and
logic configured to:
receive a high-acceleration event signal from the shock sensor interface; and
responsive to the high-acceleration event signal, maintain the voltage switch at the protective voltage input for a time span selected to prevent damage during the high-impulse event.

In yet another aspect, this specification discloses a night vision system comprising:
a photocathode configured to receive an input image and configured to emit a photoelectron stream responsive to the input image;
a microchannel plate comprising an input face, an output face, and a plurality of microchannels, and configured to receive the photoelectron stream into the plurality of microchannels and to intensify the photoelectron stream as a function of a negative voltage at the input face with respect to the output face, wherein a photocathode voltage is maintained between the photocathode and the input face of the microchannel plate;
a phosphor screen configured to receive the intensified photoelectron stream and to display an intensified image;
a shock sensor configured to detect a high-acceleration event and to provide a responsive signal; and
a controller configured to receive the signal from the shock sensor and upon receiving the signal, to maintain the photocathode voltage at a protective level for a time span selected to allow the high-acceleration event to pass.

DETAILED DESCRIPTION OF THE EMBODIMENTS

Turning now to the included figures, an exemplary embodiment of image intensifier is disclosed in more detail. In accordance with standard practices, various features are not drawn to scale and are used for illustration purposes only. Those with skill in the art will recognize numerous modifications of the configurations shown that still fall within the scope of the appended claims.

Figure 1:
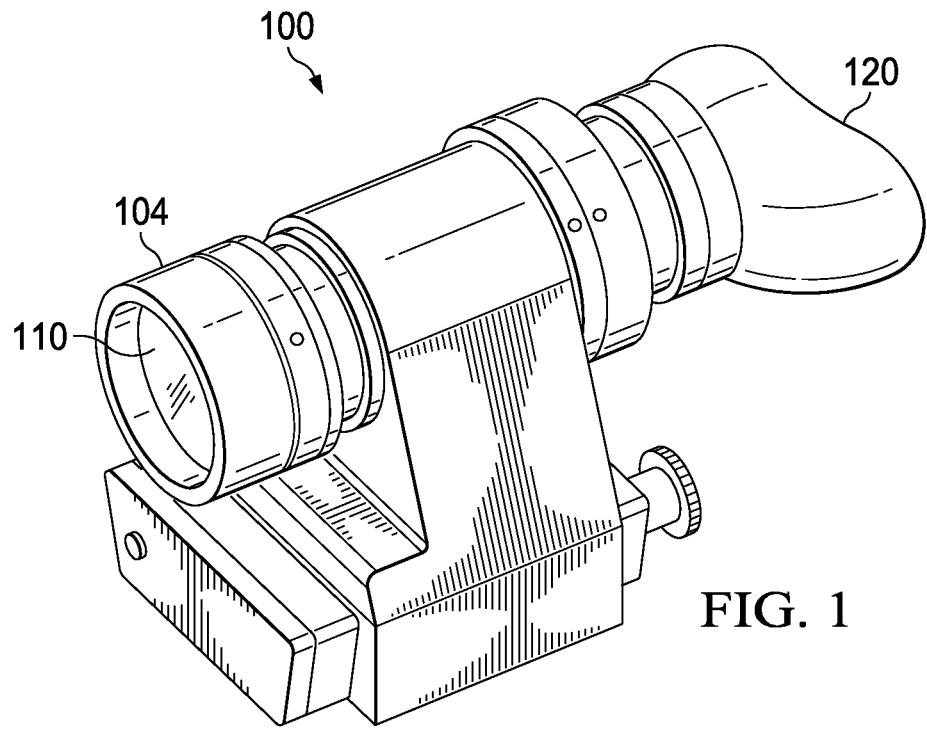
FIG. 1 is a perspective view of a shock-resistant night vision system.

FIG. 1 is a perspective view of an exemplary embodiment of a standalone night vision system 100. Night vision system 100 may be configured for independent use, such as in a night vision monocular, or it may be mounted on a rifle for use as a nighttime-capable scope. Night vision system 100 includes a lens 110 allowing ambient light to enter, an eyepiece 120 where a user may see the enhanced image, and focus housing 104 for adjusting the focus of the image. In some embodiments, night vision system 100 is mounted on a high caliber rifle, which may cause recoil, shock, or other high-acceleration events that disrupt the operation of night vision system 100, and which may cause permanent damage.

In particular, it has been observed that image intensifiers, and in particular nighttime-capable scopes configured for mounting to rifles, experience failures modes under certain high-acceleration or "shock" conditions. For example, some image intensifiers experience complete failure after a shock event, while others continue to operate but develop permanently "dead" pixels. End users may consider either or both of these situations unacceptable, particularly for high-performance equipment.

Figure 2:
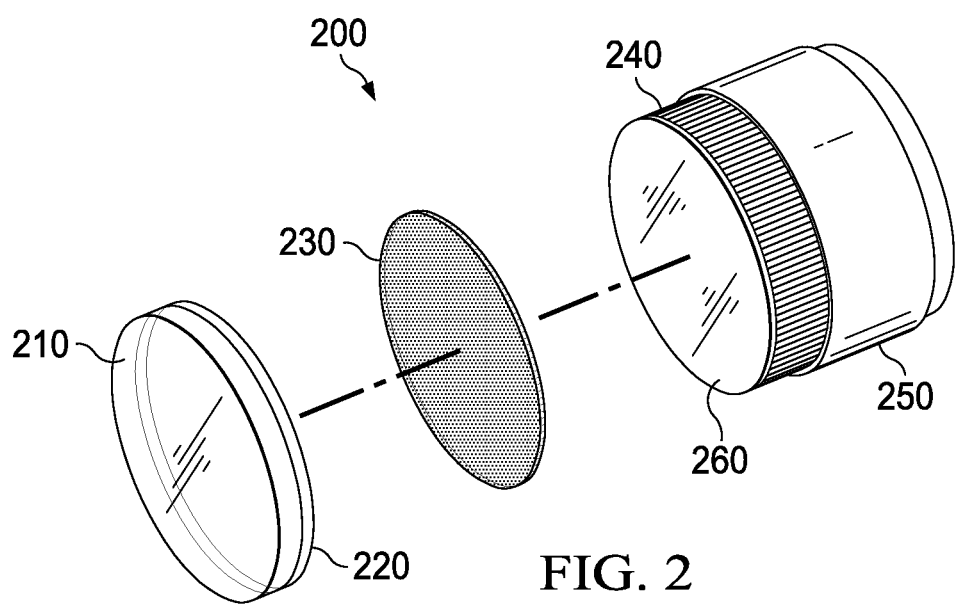
FIG. 2 is a cutaway perspective view of an image intensifier tube.

Although the exact failure mechanism is not known, possible causes are better understood with reference to FIG. 2, which is a cutaway perspective view of an image intensifier tube (IIT) 200 for use in a night vision system 100. IIT 200 comprises a photocathode 220, a microchannel plate (MCP) 230, and phosphor screen 260. Photocathode 220 is a very thin light-sensitive film that is bonded or deposited to the back side of a glass input face plate 210. When a photon image is applied through the input face plate 210 onto photocathode 220, photocathode 220 emits photoelectrons into the vacuum space between photocathode and MCP 230. The pattern of photoelectrons emitted by photocathode 220 is a replica of the photon image. The photoelectrons are accelerated from photocathode 220 by a negative voltage applied to photocathode 220 with respect to the input face of MCP 230.

MCP 230 is a thin glass wafer with many microscopic channels running through it. A large negative voltage is applied to the input face of MCP 230 with respect to the output face of MCP 230. Each channel functions as a dynode multiplier with electronic gain dependent on the magnitude of the voltage applied across MCP 230. Photoelectrons enter and strike the walls of the channels and through the process of secondary electron emission, the incident electron flux is amplified by up to thousands of times.

Because the spatial relationship of the photoelectrons entering the channels of MCP 230 is preserved throughout the gain process, the resulting electron beam exiting MCP 230 is an intensified replica of the original image incident on photocathode 220. This electronic image is then accelerated toward phosphor screen 260 by a high voltage applied between the exit face of MCP 230 and phosphor screen 260, where the electron energy is converted into light. Phosphor screen 260 is deposited onto the input side of a fiber optic bundle 240, which directs the intensified image to its output surface for viewing by the user.

Failures are sometimes noted in night vision systems 100 mounted to high-caliber or military-grade rifles, including for example .50 caliber rifles. MCP 230 is a very thin glass wafer, which in some embodiments may be approximately 11 mils thick, or up to 20 mils thick in other embodiments, and is very close to photocathode 220, with the distance being less than 10 mils in an exemplary embodiment. During operation, a shock event may cause MCP 230 to bow outward toward and physically strike photo cathode 220. In one possible scenario, the physical impulse of MCP 230 striking photocathode 220 may cause an electrical discharge between photocathode 220 and the input face of MCP 230. This can result, for example, in irreversible damage to photocathode 220 or MCP 230 in the area of the collision, resulting in dead pixels or other flaws in the image.

A second theory holds that when MCP 230 deforms and goes outward toward photocathode 220, the negatively charged photocathode 220 and the positively charged input face of MCP 230 attract one another, enhancing the deformation of MCP 230. This attraction may occur even though both may be negative with respect to ground, since electric fields do not behave like discrete charged particles. As long as there is a difference in potential, they may be attracted.

Damage may also occur through arcing. In theory, a vacuum is a very good insulator, with a characteristic breakdown voltage of approximately $10^5$-$10^7$ V/cm for an ideal vacuum. But high-shock events may cause mechanical excursions of MCP 230 that bring it close enough to photocathode 220 to come within the dielectric breakdown strength of the non-ideal vacuum, thereby causing arcing between MCP 230 and photocathode 220. Physical contact may also cause mechanical damage in addition to electrical damage.

Figure 3:
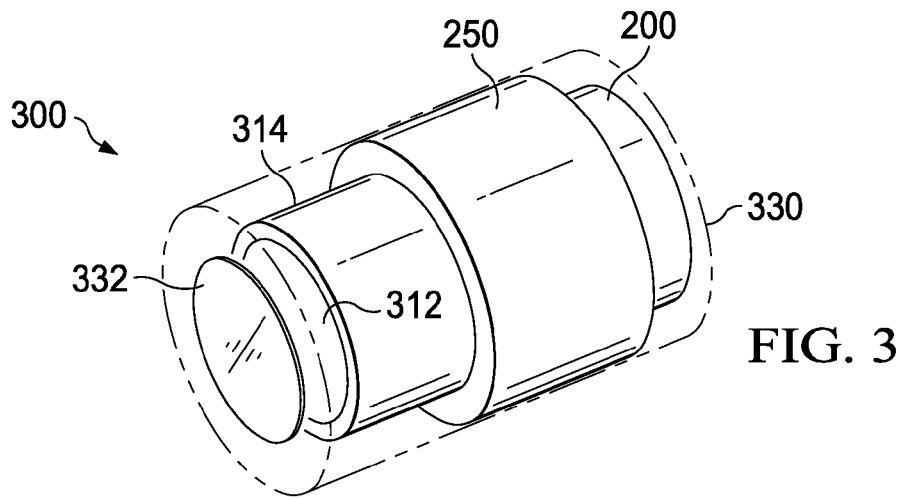
FIG. 3 is a cutaway perspective view of an image intensifier assembly (IIA).

FIG. 3 is an exemplary embodiment of image intensifier assembly (IIA) 300. IIA 300 comprises image intensifier tube 200 and high voltage power supply 250, encapsulated into plastic housing 330 using a suitable high dielectric material 312 such as RTV. Dielectric material 312 is placed to completely fill the space between plastic housing 330 and the outer edge 314 of IIT 200. An aperture 332 is provided to expose face plate 210. The encapsulating material provides electrical isolation to prevent dielectric breakdown and mechanical support for maintaining proper positioning within the plastic housing.

Photocathode 220, MCP 230, and screen 260 may be provided as a pre-manufactured IIT 200. These elements are seated in close proximity to each other using a series of concentric ceramic and metal rings for electrical and hermetic isolation. A high voltage power supply 250 provides the necessary voltages to IIA 300. In some embodiments, high-voltage power supply 250 is provided as a circuit board that wraps around IIT 200.

Figure 4:
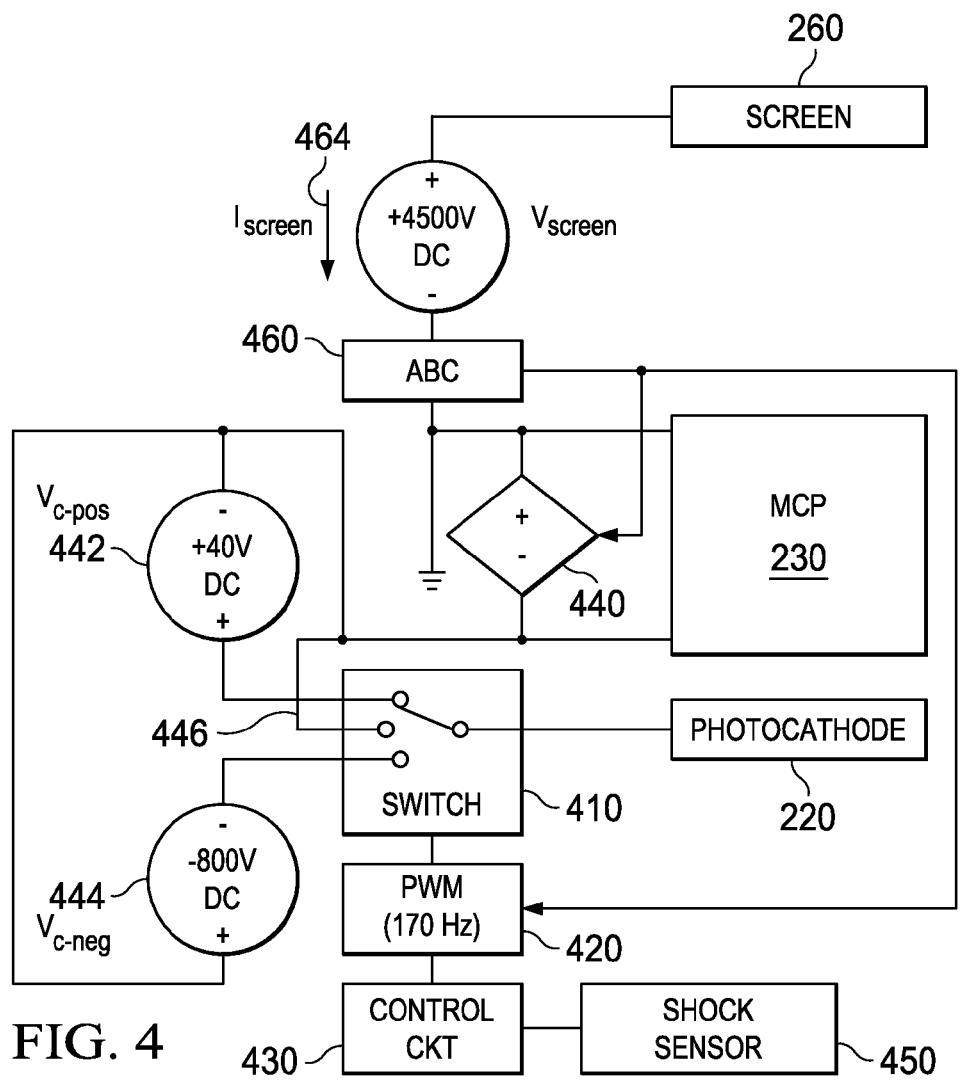
FIG. 4 is a block diagram of an exemplary shock-resistant image intensifier.

FIG. 4 is a block diagram of an exemplary electrical system for mitigating shock damage to night vision system 100 during operation. The circuit described in the block diagram of FIG. 4 helps to mitigate the risk of a short circuit, even if MCP 230 deforms during a shock event. As seen in FIG. 4, MCP 230 has a voltage 440 across its two terminals, which maintains a relatively large electrical potential between the input side and output side of MCP 230. The magnitude of MCP voltage 440 may be controlled according to an automatic brightness control 460, which is sensitive to current flowing out of screen 260 and which provides a negative feedback loop.

In one exemplary embodiment where autogating is provided, pulse width modulator 420 provides switching of the voltage between photocathode 220 and the input face of MCP 230, with a pulse width with an exemplary frequency of 170 Hz. The magnitude of image intensification is a function of the average current, and therefore to the duty cycle of pulse width modulator 420. The duty cycle of the pulse width may be adjusted depending on either photocathode 220 or the screen current, or both. In low ambient light conditions, the duty cycle may be as high as 99.7%. In high ambient light conditions, the duty cycle may drop to as low as 0.04%. The lower duty cycle provides a lower average photocathode current according to principles well-known in the art, and therefore less image intensification.

As screen current 464 increases beyond a predetermined threshold, MCP voltage 440 is also reduced to reduce the gain of the IIA in order to keep the screen output brightness at a comfortable level for the user. A positive (inactive-level) photocathode voltage 442 and negative (active-level) photocathode voltage 444 may also be provided. These voltages are maintained with respect to the input face of MCP 230 (not necessarily with respect to ground). In the exemplary embodiment, they are controlled by switch 410. Switch 410 is provided to select between positive photocathode voltage 442 and negative photocathode voltage 444. Switch 410 may be, for example, a high-speed solid-state switch controlled by pulse width modulator 420. In other exemplary embodiments, switch 410 may be a mechanical or electromechanical switch. Because photoelectrons accelerate from photocathode 220 toward MCP 230 when a negative voltage is applied to photocathode 220, negative photocathode voltage 444 is considered to be the operational or "active" voltage level, while positive photocathode voltage 442 is considered an "inactive" or off state voltage level. In some embodiments, a third voltage 446 may be provided, for example, by shorting photocathode 220 to the input side of MCP 230. If third voltage 446 is selected, there will be no electrical potential between the input side of MCP 230 and photocathode 220. While this will prevent operation because photoelectrons will not enter MCP 230, it will also prevent any attractive force from developing, and will prevent electrical damage from arcing.

A shock sensor 450 is provided, which may include, for example, an accelerometer of one, two, or three axes, or a one-or-more axis "g-switch," which opens or closes on a sufficiently high-acceleration event but does not sense the magnitude of acceleration. G-switches may be suitable for some embodiments because they may be smaller and cheaper than accelerometers. If one or two axes are used, then the axes most likely to experience shock should be selected. For example, if a one-axis accelerometer or g-switch is used, the horizontal axis defined by the barrel of the weapon may be used, as this is the axis that experiences the greatest shock, and is also the axis along which MCP 230 is most likely to deform. In an exemplary embodiment, shock sensor 450 is a SignalQuest SQ-ASB-075-I.

A control circuit 430 is communicatively coupled to shock sensor 450. Control circuit 430 is configured to receive shock event inputs from shock sensor 450, and responsive to the shock event, send an interrupt to pulse width modulator 420, forcing switch 410 to select either positive photocathode voltage 442 or third voltage 446 for the duration of the event. Control circuit 430 may be configured to interrupt pulse width modulator 420 for a period that is selected to be long enough to enable MCP 230 to return to its operational position without damage, while also being short enough to not be noticeable by a human operator. In an exemplary embodiment, control circuit 430 interrupts pulse width modulator 420 for approximately 50 milliseconds.

In operation, a user may mount a night vision system 100 on a high-caliber rifle, or in some other high-shock environment. When the user fires a round or burst from the weapon, the high-acceleration event activates shock sensor 450. Upon detecting the event, shock sensor 450 provides a signal to control circuit 430. Control circuit 430 is configured to control pulse width modulator 420 and force it to a "low" or "inoperative" condition for a selected period of time, which in the exemplary embodiment is 50 ms. The low or inoperative voltage may be, for example, positive photocathode voltage 442 or third voltage 446, and in general is selected to protect MCP 230 and photocathode 210 from damage. Thus, the low or inoperative voltage may be referred to as a "protective" voltage. In embodiments where a pulse-width modulator is not present, control circuit 430 may directly control a voltage switch. After sensing the acceleration event, shock sensor 450 maintains photocathode 220 at the protective voltage for a time period selected to allow perturbations to settle, which in an exemplary embodiment is 50 ms. Those with skill in the art will recognize that "holding" the photocathode at this voltage implies merely maintaining a certain voltage difference between the input face of MCP 230 and photocathode 210, and that this may involve switching either MCP 230, or photocathode 210, or both, or in some cases, for example where a pulse width modulator is used, no switching may occur if the pulse width modulator is already at a low state when the acceleration event occurs. The 50 ms delay is selected to ensure that for the duration of the shock event, photocathode 220 is in a non-operational state. Because photocathode 220 is in a non-operational state, the risk of damage to MCP 230 and photocathode 210 is mitigated. After the expiration of 50 ms, the pulse width modulator 420 resumes its normal operational state. 50 ms is selected as a balance between the competing goals of holding the MCP at a protective voltage long enough to allow perturbations to settle, but not so long that it is disruptive to the user's experience. In some embodiments, additional suitable values may be selected. For example, in some embodiments with lower shock ratings, the value may be as low as 30 ms, while in extremely high-shock environments, the value may be as large as 100 ms to 500 ms. Other exemplary embodiments include, by way of non-limiting example, delays in the range of 0 ms to 100 ms, 10 ms to 50 ms, and 30 ms to 100 ms. In general, even a delay of 500 ms may not be very noticeable to a user, particularly in the midst of a high-shock event. However, where other design parameters are present, a person having skill in the art may select an appropriate time.

Notably, FIG. 4 discloses an exemplary power supply circuit for an "autogated" configuration, which is only one of several possible configurations. Some prior art power supplies will hold the photocathode voltage at substantially a steady-state negative voltage. In such cases, switch 410 need not be a high-speed electronic switch. In some embodiments of such cases, switch 410 could be, for example, integrated directly with shock sensor 450 and control circuit 430 in the form of an acceleration-sensitive (for example, spring-loaded) mechanical switch that has a rest state at the active photocathode voltage, and that switches to an protective voltage in the presence of a high acceleration, but that is configured to not mechanically recover to its operational state before MCP 230 has had sufficient time to recover.

According to principles known in the art, a weighted spring's excursion from rest state and recovery time to rest state are both inversely proportional to the spring constant k. Given a spring with a weighted mass m, experiencing acceleration a, displacement along an axis, x, can be expressed as:

$$x = -\frac{ma}{k}. \tag{1}$$

The time, T, for the spring to recover to its initial rest position is given by:

$$T = 2\pi\sqrt{\frac{m}{k}}. \tag{2}$$

If damping is used to prevent additional oscillations, then a damping ratio, $\zeta$, may be calculated as function of the damping coefficient c as follows:

$$\zeta = \frac{c}{2\sqrt{mk}}. \tag{3}$$

Where $\zeta=1$, the system is "critically damped," so that it will experience no more than a single oscillation. Thus, it is within the skill of one having skill in the art to select a spring of spring constant k and damper of coefficient c such that upon an acceleration a, the spring will move to a position x selected to open a mechanical switch, and recover to the closed position at time T.

In other embodiments, screen voltage 446 may also be switched to a higher, stepped-up voltage in the presence of an acceleration event. This may cause an electromagnetic attraction between screen 260 and MCP 230, which may be desirable because MCP 230 is much farther away from screen 260 than from photocathode 220. Thus, an attraction between screen 260 and MCP 230 may actually limit excursions toward photocathode 210.

Advantageously, in this configuration, image intensifier assembly 300 is maintained in an nonoperational state only while the rifle and operator themselves are recoiling from the shot. In such circumstances, the user will have poor visibility anyway. By the time the shock even perceptibly passes, image intensifier assembly 300 has returned to its operational state, without having sustained damage from the recoil.

Although the subject of this specification has been described with reference to one or more embodiments, it is not intended that the foregoing description limit the appended claims.

What is claimed is:

1. A method comprising:
providing a voltage at an active level between a photocathode and an input face of a microchannel plate;
detecting a high-acceleration event; and
responsive to the high-acceleration event, maintaining the voltage at a protective level for a time span selected to permit acceleration-induced perturbations of the microchannel plate to settle.

2. The method of claim 1 wherein the time span is further selected to be short enough to be substantially unnoticeable by a human operator.

3. The method of claim 1 wherein the time span is approximately 50 ms.

4. The method of claim 1 wherein the time span is between approximately 30 ms and 500 ms.

5. The method of claim 1 wherein the time span is between approximately 30 ms and 100 ms.

6. The method of claim 1 wherein the protective voltage level is a short between the photocathode and the input face of the microchannel plate.

7. The method of claim 1 wherein the active voltage level is negative and the protective voltage level is positive.

8. The method of claim 1 wherein the active voltage level is between approximately −200V and −800V, and the protective voltage level is between −100V and 100V.

9. A controller for an image intensifier comprising:
a shock sensor interface;
a voltage switch configured to receive an active voltage input and a protective voltage input; and
logic configured to:
receive a high-acceleration event signal from the shock sensor interface; and
responsive to the high-acceleration event signal, maintain the voltage switch at the protective voltage input for a time span selected to prevent damage during the high-acceleration event.

10. The controller of claim 9 wherein the time span is approximately 50 ms.

11. The controller of claim 9 wherein the time span is between approximately 30 ms and approximately 500 ms.

12. The controller of claim 9 wherein the voltage switch further includes a pulse-width modulator switching between the active voltage input and a third voltage input whereby a duty cycle is provided.

13. The controller of claim 12 wherein the third voltage input is the protective voltage input.

14. The controller of claim 12 wherein the active voltage input is negative, the protective voltage input is positive, and the third voltage input is substantially zero.

15. An image intensifier incorporating the controller of claim 9.

16. The image intensifier of claim 15 wherein the active voltage is a voltage difference between a screen and a microchannel plate, and the protective voltage is an increased voltage between the screen and the microchannel plate.

17. A night vision system comprising:
a photocathode configured to receive an input image and configured to emit a photoelectron stream responsive to the input image;
a microchannel plate comprising an input face, an output face, and a plurality of microchannels, and configured to receive the photoelectron stream into the plurality of microchannels and to intensify the photoelectron stream as a function of a negative voltage at the input face with respect to the output face, wherein a photocathode voltage is maintained at the photocathode with respect to the input face of the microchannel plate;
a phosphor screen configured to receive the intensified photoelectron stream and to display an intensified image;
a shock sensor configured to detect a high-acceleration event and to provide a responsive signal; and
a controller configured to receive the signal from the shock sensor and upon receiving the signal, to maintain the photocathode voltage at a protective level for a time span selected to allow the high-acceleration event to pass.

18. The image intensifier of claim 17 wherein the system is configured to be mounted on a high-caliber firearm.

19. The image intensifier of claim 17 wherein the time span is further configured to be substantially unnoticeable to a human operator.

20. The image intensifier of claim 17 wherein the time span is approximately 50 ms.

21. The image intensifier of claim 17 further comprising a pulse width modulator configured to provide autogating to the photocathode.

22. The image intensifier of claim 17 wherein the protective voltage is substantially zero.

23. The image intensifier of claim 17 wherein the protective voltage is positive.

24. The image intensifier of claim 17 wherein the protective voltage is a negative voltage selected to be substantially outside of the operative range of a preferred photocathode voltage.

25. The image intensifier of claim 17 wherein the shock sensor and controller comprise a weighted spring switch selected to move to an open position responsive to the high-acceleration event.

26. The image intensifier of claim 25 wherein the shock sensor and controller further comprise a damper.

27. The image intensifier of claim 26 wherein the spring and damper are selected to substantially limit the spring to one oscillation in each high-acceleration event.

* * * * *